United States Patent [19]

Hackhel

[11] 3,959,562
[45] *May 25, 1976

[54] FILM BACKINGS PREPARED FROM THERMOPLASTIC POLYESTER-URETHANE ELASTOMERS AND PHENOXY RESINS

[76] Inventor: Robert H. Hackhel, 414 Hickory, Lombard, Ill. 60148

[*] Notice: The portion of the term of this patent subsequent to Apr. 30, 1991, has been disclaimed.

[22] Filed: Nov. 6, 1973

[21] Appl. No.: 413,286

Related U.S. Application Data

[62] Division of Ser. No. 285,434, Aug. 31, 1972, abandoned.

[52] U.S. Cl. .............................. 428/423; 427/207; 428/480
[51] Int. Cl.² .............................................. C09J 7/02
[58] Field of Search .... 117/122 PA, 122 P, 122 PF, 117/68.5, 76 A; 260/858; 428/423, 480; 427/207

[56] References Cited
UNITED STATES PATENTS

| | | | |
|---|---|---|---|
| 3,177,090 | 4/1965 | Bayes et al. | 117/72 |
| 3,246,049 | 4/1966 | Webber | 117/122 X |
| 3,311,527 | 3/1967 | Urbanic et al. | 161/64 |
| 3,320,090 | 5/1967 | Graubart | 117/161 |
| 3,378,630 | 4/1968 | Mendelsohn et al | 117/122 X |
| 3,384,679 | 5/1968 | Stetz | 260/830 |
| 3,437,622 | 4/1969 | Dahl | 117/122 X |
| 3,440,086 | 4/1969 | Kerns | 117/105.5 |
| 3,504,627 | 4/1970 | Elder et al. | 101/395 |
| 3,628,992 | 12/1971 | McKillip | 117/122 |
| 3,743,617 | 7/1973 | Kest | 117/122 X |
| 3,756,848 | 9/1973 | Dahl | 117/122 |
| 3,761,307 | 9/1973 | Dahl | 117/122 |
| 3,778,302 | 12/1973 | Dahl | 117/122 X |
| 3,796,678 | 3/1974 | Bartizal | 117/122 X |

Primary Examiner—Bernard D. Piamalto
Attorney, Agent, or Firm—Ellen P. Trevors

[57] ABSTRACT

A flexible, solvent-resistant film backing for pressure-sensitive adhesives is disclosed. The backing comprises a thermoplastic essentially linear polyester-urethane elastomer and a thermoplastic phenoxy resin having the formula

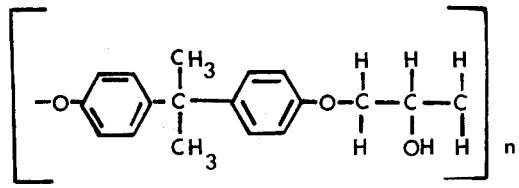

wherein $n$ is an integer from 50 to 150, the phenoxy resin being present in an amount from about 35 to about 100 parts per 100 parts by weight of the polyester-urethane elastomer.

5 Claims, No Drawings

FILM BACKINGS PREPARED FROM THERMOPLASTIC POLYESTER-URETHANE ELASTOMERS AND PHENOXY RESINS

This is a division of application Ser. No. 285,434 filed Aug. 31, 1972 now abandoned.

This invention relates to a flexible, solvent-resistant film backing. More particularly, this invention relates to film backings which are highly resistant to crude oil, aliphatic hydrocarbons and jet fuels.

While adhesives having good solvent-resistant properties have been developed, for example, see copending patent application Ser. No. 205,284, filed Dec. 6, 1971 now U.S. Pat. No. 3,808,288, a tape backing having suitable solvent-resistant properties has been a long sought for industry objective. There are tapes having solvent-resistant properties, but they generally suffer from various disadvantages in their physical properties. Thus, polyester and cellulose acetate films are stiff and non-conformable over irregular surfaces, have poor tear strength and are lacking in abrasion resistance, while polyvinyl chloride backings are prone to thermal degradation and plasticizer extraction by various oils, hydrocarbons and fuels.

Now it has been found in accordance with this invention that flexible film backings having excellent solvent resistance and good physical properties can be prepared from certain thermoplastic polyester-urethane elastomers and thermoplastic phenoxy resins.

The thermoplastic, essentially linear polyester-urethane elastomers employed in this invention are prepared from essentially linear hydroxyl terminated polyesters having an average molecular weight between 600 and 1200 and an acid number less than 10, and a diphenyl diisocyanate. These elastomers are fully described in U.S. Pat. No. 2,871,218 which is hereby incorporated by reference in its entirety. Preferably, elastomers prepared by reacting hydroxyl poly(tetramethylene adipate), butanediol-1,4 and diphenylmethane-p,p'-diisocyanate are employed.

The thermoplastic phenoxy resins employed in the preparation of the films of this invention have the formula

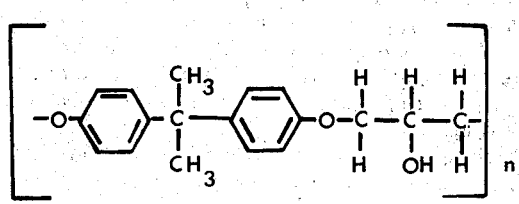

wherein $n$ is an integer from 50 to 150. These phenoxy resins are employed in an amount from about 35 to about 100 parts per 100 parts by weight of the polyester-urethane elastomer.

The films are prepared by mixing at least one elastomer with at least one resin in any suitable manner, for example, on a two-roll mill, a Banbury mixer or a twin-screw extruder and then extruding or calendering the film. Preferably, the elastomer and resin are mixed at temperatures from about 300° to 320°F.

The films of this invention are particularly valuable as backings for solvent-resistant adhesives. Suitable adhesives include those based on an epihalohydrin polymer and a thermoplastic polyketone resin, as disclosed in copending U.S. patent application Ser. No. 205,284, filed Dec. 6, 1971; nitrile rubber based adhesives, such as those described in U.S. Pat. No. 2,601,016; adhesives containing chloroprene, etc. Because of their good physical properties, the films of this invention can also be used as supports for any pressure-sensitive adhesive, such as those based on polymers derived from acrylate/methacrylate monomers and one or more of the following monomers: N-alkyl substituted amido derivatives of monoethylenically unsaturated mono- and dicarboxylic acids, N-alkyl substituted amino salts of said monocarboxylic acids and half-esters of said dicarboxylic acids. These adhesives are fully described in U.S. Pat. No. 3,299,010. Other acrylate adhesives and rubber based adhesives can also be used.

The films of this invention can be used as the sole backing for an adhesive tape, or they can be laminated to other backings, such as fiberglass, etc.

In preparing the films of this invention where a second backing and/or an adhesive layer are to be applied, it is convenient to use the method of making fused film laminates described in U.S. Pat. No. 2,879,547.

While the use of additional or supplemental materials is not required in making the films of this invention, optional ingredients such as fillers, colorants antioxidants, stabilizers etc. can be employed.

As mentioned previously, the film backings of this invention have a combination of desirable physical and chemical properties. Thus, the backings are sufficiently stiff to allow them to be unwound and handled conveniently, conformable to irregular surfaces, and resistant to degradation by oils and aliphatic hydrocarbons.

The film properties are superior to those of films made from either the polyester-urethane elastomer alone or the phenoxy resin alone. Thus, film backings made from the polyester-urethane elastomers are very tacky, elastomeric or stretchy, and have a low secant modulus, while films made from phenoxy resins alone are very stiff and thus non-conformable to irregular surfaces.

In the following examples which are intended to illustrate the practice of this invention, tensile strength, elongation and secant modulus were determined according to ASTM Test Procedure D-882-67, Method A; solvent resistance was tested following ASTM D-543-67.

EXAMPLE 1

Six hundred grams of Estane 5710 and 400 g. of Bakelite Phenoxy Resin PKHH were milled on a two-roll mill, each roll having a length of 12 inches and a diameter of 6 inches, with the rolls turning at differential speeds and heated to a temperature of about 300°F. Estane 5710 is a thermoplastic, essentially linear polyester-urethane elastomer marketed by B. F. Goodrich Chemical Company. Bakelite Phenoxy Resin PKHH is a thermoplastic phenoxy resin made from bisphenol A and epichlorohydrin, and containing about 100 repeating units in the polymer; it is marketed by Union Carbide Corporation. The blend was then calendered into a smooth film of 10 to 12 mils in thickness on a two-roll calender having a first roll temperature of 400°F and a second roll temperature of 165°F. The resulting film was not tacky, could be wound on itself, had a tensile strength of 5080 p.s.i., an elongation at break of 121%, and a secant modulus at 1% strain of 55,200 p.s.i.

For purposes of comparison, 1000 g. of Estane 5710 was milled and calendered under the same conditions employed in the preceding paragraph, except the temperature of the first roll was 400°F and that of the second roll, 120°F. The resultant film was very stretchy and tacky, could not be rolled upon itself, and had a secant modulus at 1% strain of 1,250 p.s.i.

EXAMPLE 2

Following the procedure of Example 1, a calendered film was produced from 600 g. of Estane 5701 and 400 g. of Bakelite Phenoxy Resin PKHH. Estane 5701 is a thermoplastic essentially linear polyester-urethane elastomer marketed by B. F. Goodrich Chemical Company. The first roll temperature of the calender was 420°F and the second roll temperature was 170°F. The calendered film had a tensile strength of 7180 p.s.i., an elongation at break of 176% and a secant modulus at 1% strain of 54,000 p.s.i. The film was not tacky and was easy to handle. After 7 days immersion in heptane, a specimen of the film exhibited a 2.7% increase in weight. Upon drying for 7 days, the weight increase with respect to the initial weight of the specimen was 0.57%, indicating good resistance to heptane.

For purposes of comparison, 1000 g. of Estane 5701 was milled and calendered under the conditions employed above, but heating the first roll of the calender to 400°F and the second roll to 140°F. The resultant film was very stretchy and blocked when rolled on itself; it had a secant modulus of 2,940 p.s.i.

EXAMPLE 3

The procedure of Example 1 was followed again to prepare a film from 600 g. of Estane 5707 and 400 g. of Bakelite Phenoxy Resin PKHH. The first roll of the calender was heated to 400°F and the second roll to 185°F. The Estane 5707 is another of B. F. Goodrich's thermoplastic, essentially linear polyester-urethane elastomers. The tensile strength of the calendered film was 7530 p.s.i., the elongation 85% and the secant modulus at 1% strain was 206,000 p.s.i.

For purposes of comparison, 1000 g. of Estane 5707 was processed as above, but using a second roll calender temperature of 140°F. While the resultant film was less tacky than those made from other Estane elastomers, it was very rough in appearance. The secant modulus at 1% strain was 6,170 p.s.i.

EXAMPLE 4

Six hundred grams of Estane 58092 (another thermoplastic polyester-urethane marketed by B. F. Goodrich Chemical Company), 400 g. of Bakelite Phenoxy Resin PKHH and 10 g. of carbon black were milled as described in the preceding examples.

A pressure-sensitive adhesive mass was prepared on a rubber mill in a conventional manner from 1100 g. of milled Hydrin 200 (an epiclorohydrin-ethylene oxide copolymer elastomer marketed by B. F. Goodrich Chemical Company); 386 g. of Polyketone Resin ZKRA-0252 (a resin sold by Union Carbide Corporation, which infrared analysis indicates is an acetophenone resin); 18 g. of Agerite Resin D (a polymerized trimethyl dihydroquinoline marketed by R. T. Vanderbilt Company); 100 g. of Hi-Sil (hydrated silica sold by Pittsburgh Plate Glass Company); and 11 g. of carbon black.

A tape was then prepared according to the process described in U. S. Pat. No. 2,879,547 employing film calendering roll temperatures of 420°F and 200°F; the temperature of the third roll was 330°F. The resultant product had a tensile strength modulus at 1% strain of 104,000 p.s.i.

What is claimed is:

1. A solvent resistant adhesive tape consisting of a solvent resistant flexible backing having supported thereon a solvent resistant pressure sensitive adhesive, said flexible backing comprising a thermoplastic, essentially linear polyester urethane elastomer and a thermoplastic phenoxy resin having the formula

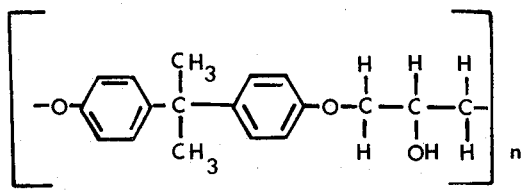

wherein $n$ is an integer from 50 to 150, said phenoxy resin being present in an amount from about 35 to about 100 parts per 100 parts by weight of said polyester-urethane elastomer, said solvent resistant pressure sensitive adhesive consisting essentially of a mixture of about 30–150 parts of a thermoplastic, polyketone resin per 100 parts of an elastomeric epihalohydrin polymer wherein said elastomeric epihalohydrin polymer comprises recurring units having the formula:

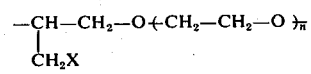

wherein X is chlorine or bromine and $n$ is zero to 2, and said polyketone resin comprises the condensation product of an aliphatic ketone having a total of 3 to 6 carbon atoms; a monoaryl alkyl ketone having from 6 to 10 ring carbon atoms in the aryl group and from 1 to 4 carbon atoms in the alkyl group; an aliphatic ketone having a total of 3 to 6 carbon atoms with a lower aliphatic aldehyde; a monoaryl alkyl ketone having from 6 to 10 ring carbon atoms in the aryl group and from 1 to 4 carbon atoms in the alkyl group with a lower aliphatic aldehyde; or a carboxyclic ketone having 3 to 7 ring carbon atoms with a lower aliphatic aldehyde.

2. The adhesive tape of claim 1 wherein said polyurethane elastomer is the reaction product of hydroxyl poly(tetramethylene adipate), butanediol-1,4 and diphenyl methane-p,p'-diisocyanate.

3. The adhesive tape of claim 1 wherein about 66 parts by weight of said phenoxy resin is employed in said flexible backing.

4. The adhesive tape of claim 2 wherein about 66 parts by weight of said phenoxy resin is employed in said flexible backing.

5. The adhesive tape of claim 1 wherein said polyurethane elastomer is the reaction product of hydroxyl poly(tetramethylene adipate), butanediol-1,4 and diphenyl methane-p,p'-diisocyante, and in the formula is about 100 resin has the formula set forth in claim 1 wherein $n$ is about 100.

* * * * *